UNITED STATES PATENT OFFICE.

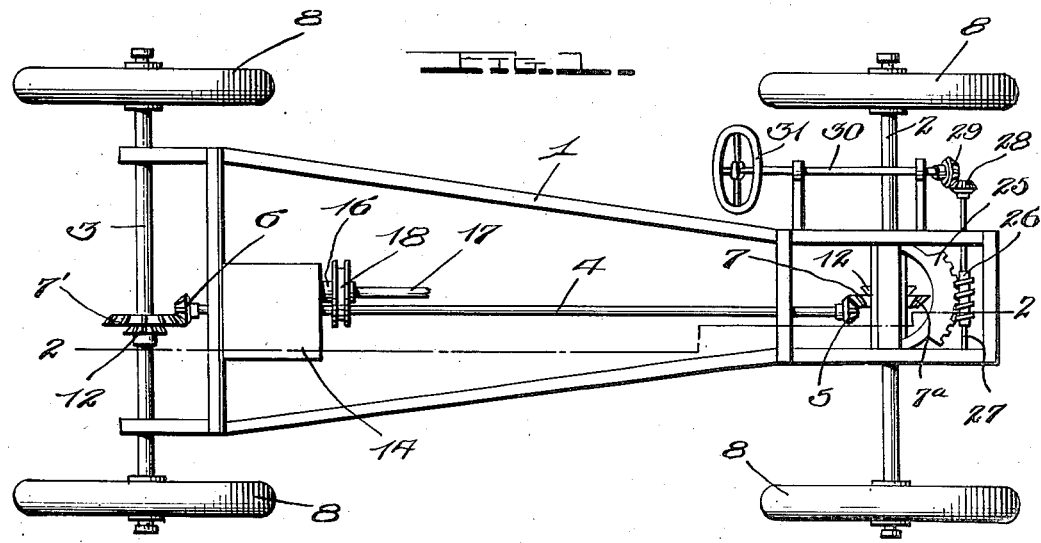
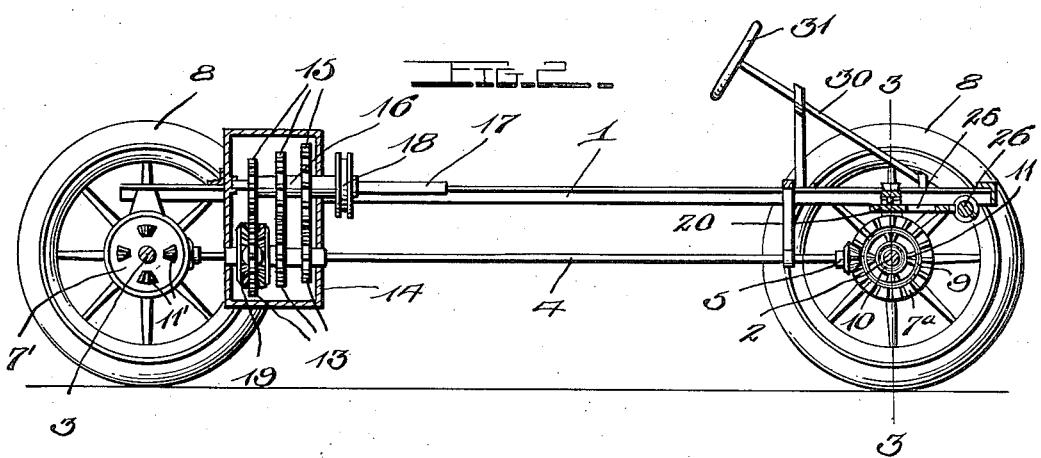
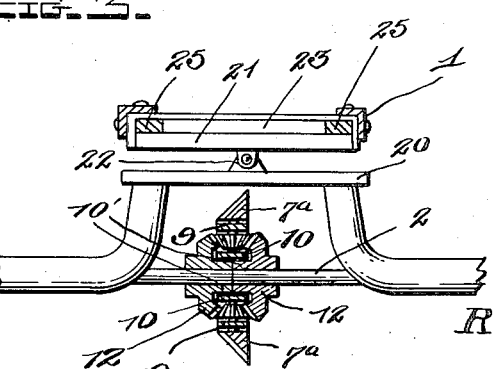

ROBERT E. TWYFORD, OF SOUTH HOUSTON, TEXAS.

DRIVING-GEARING FOR MOTOR-VEHICLES.

1,136,382.   Specification of Letters Patent.   Patented Apr. 20, 1915.

Application filed July 25, 1912, Serial No. 711,595. Renewed September 10, 1914. Serial No. 861,137.

*To all whom it may concern:*

Be it known that I, ROBERT E. TWYFORD, a citizen of the United States, residing at South Houston, in the county of Harris and State of Texas, have invented certain new and useful Improvements in Driving-Gearing for Motor-Vehicles, of which the following is a specification, reference being had to the accompanying drawings.

This invention relates to certain new and useful improvements in the driving mechanism of motor vehicles of which the management and control of the vehicles are facilitated, the object of the invention being to provide a motor vehicle in which all the wheels may be used for traction purposes and in which a large variation of speed may be quickly obtained by simple mechanism.

Another object of the invention is to provide a device of the above character which will possess advantages in points of efficiency and durability, is inexpensive to manufacture and at the same time is simple in construction and operation.

With the above and other objects in view the invention consists in the novel features of construction and the combination and arrangement of parts hereinafter more fully described, pointed out in the claims, and shown in the accompanying drawings, in which—

Figure 1 is a top plan view., Fig. 2 is a sectional view on the line 2—2 of Fig. 1. Fig. 3 is a sectional view on the line 3—3 of Fig. 2.

Referring to the drawing, the numeral 1 designates the frame of a vehicle, said frame being mounted upon a front axle 2 and rear axle 3, said axles being of the floating type, as best illustrated in Fig. 3. Suspended from the frame of the vehicle is the main shaft 4 which extends longitudinally of the vehicle and is provided at each end with the beveled pinions 5 adapted to mesh with the beveled gears 7 and 7' which are mounted upon the front and rear axles, said axle carrying the wheels 8 upon each end thereof. The gear 7 is a special gear consisting of an outer ring 7ª having teeth thereon and supported by the two concentric rings 9 and 10, the latter being loosely mounted upon the inner hubs 10' of the differential gears 12. Arranged between the rings 9 and 10 are the differential gears 11 which are adapted to mesh with the gears 12 mounted upon the floating axle 2. The gear wheel 7' also carries the differential pinions 11 which are adapted to mesh with the gears 12 mounted upon the rear shaft 3.

The transmission mechanism comprises a plurality of gears 13 mounted upon the main shaft 4 and arranged within the casing 14 supported by the frame 1. The gears 13 are adapted to mesh with a second set of gears 15 arranged within the casing and mounted upon the transverse shaft 16 which is suitably connected to the tumbling shaft 17 which in turn is suitably connected to the clutch mechanism (not shown) whereby the gears may be shifted to obtain various speeds.

Mounted upon the shaft 17 and arranged upon the outer side of the casing 14 is a brake drum 18, so that when the frictional band (not shown) is drawn tightly upon the drum to apply the brake thereto, it will brake all four wheels through the transmission gears 15 and 13 and the shaft 4. Arranged within the casing 14 is a lock crab 19 which is provided so that if, either the front or rear gears are broken, the crab will lock the differential gears so as to drive either the front or rear axle alone. From the above it will be seen that all power, either driving or braking, is applied directly to the shaft 4 which controls all four wheels.

Mounted upon the front axle 2 is a frame 20 upon which is mounted the fifth wheel 21, pivotally connected to the frame 20 as shown at 22, so as to allow either of the front wheels to pass over an obstruction without wrenching the frame 1. Secured to the lower side of the front end of the frame 1 is a bearing member 23, in which is rotatably mounted the fifth wheel 21. Secured to the front side of the wheel 21 is an arcuate rack 25 which is adapted to mesh with the worm gear 26, said worm gear being mounted upon the transverse shaft 27 upon the outer end of which is mounted a gear 28 adapted to mesh with a similar gear 29 on the lower end of the driving rod 30, so that the vehicle can be easily steered by rotating the wheel 31 which is mounted upon the upper end of the rod 30.

From the above description taken in connection with the accompanying drawings, it will be readily apparent that I have provided a simple and durable motor vehicle in which all the wheels are used for traction purposes and which at the same time can be manufactured at an extremely low cost.

While I have shown and described the preferred form of my invention, it will be obvious that various changes in the details of construction and in the proportions may be resorted to for successfully carrying my invention into practice without sacrificing any of the novel features or departing from the scope thereof.

What I claim is:—

1. A gear mechanism including two axially alined shafts, a beveled gear secured on each of said shafts adjacent to their opposed ends and each being provided with a cylindrical hub extending one toward the other, three concentric rings disposed around the hubs of the beveled gears, the outermost of such rings being provided with a gearing face, while the innermost of such rings serving as a supporting mounting, radially disposed shafts operatively connecting such rings, and beveled gears mounted between the two innermost of such rings adapted to mesh with the pinions on the shafts.

2. A gear mechanism including two axially alined shafts, a beveled gear secured on each of the shafts adjacent to their opposed ends and each being provided with a cylindrical hub extending one toward the other, a plurality of concentric rings disposed around the hubs of the beveled gears, the outermost of such rings being provided with gearing faces while the innermost of such rings serves as a supporting mounting, radially disposed shafts operatively connecting said rings, and beveled gears mounted between the two innermost of said rings adapted to mesh with the pinions on the shafts.

3. A gear mechanism including two axially alined shafts, a beveled gear secured on each of the shafts adjacent to their meeting ends and each being provided with a cylindrical hub extending one toward the other, an annular ring disposed around the hubs of the gears, a toothed rim secured to the outer surface of the annular ring with the radial plane at its axial center coinciding with said meeting ends of the shafts, a plurality of beveled gears operatively mounted within said annular ring and having their longitudinal centers coinciding with the medial radial plane of said toothed rim, and a bearing ring rotatably mounted on the hubs of the first gears and coacting therewith and with the axles of said plurality of gears for supporting the latter and the said annular ring and toothed rim independently of any other supporting means.

In testimony whereof I hereunto affix my signature in the presence of two witnesses.

ROBERT E. TWYFORD.

Witnesses:
   Jas. C. Ehlinger,
   J. E. Price.